(12) United States Patent
Lee et al.

(10) Patent No.: US 9,736,322 B2
(45) Date of Patent: Aug. 15, 2017

(54) ELECTRONIC DEVICE AND METHOD OF CHECKING CONNECTED STATE OF SIGNAL LINE THEREOF

(71) Applicant: Samsung Electronics Co., Ltd., Suwon-si, Gyeonggi-do (KR)

(72) Inventors: Kwon-cheol Lee, Seoul (KR); Eon-kyeong Yi, Suwon-si (KR); Jae-yoon One, Suwon-si (KR); Chun-sub Ryu, Yongin-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/475,749

(22) Filed: Sep. 3, 2014

(65) Prior Publication Data
US 2015/0124274 A1    May 7, 2015

(30) Foreign Application Priority Data
Nov. 5, 2013    (KR) .......................... 10-2013-0133739

(51) Int. Cl.
*H04N 1/00*    (2006.01)
*G06F 13/40*    (2006.01)
(52) U.S. Cl.
CPC ..... *H04N 1/00031* (2013.01); *G06F 13/4068* (2013.01); *H04N 1/00037* (2013.01); *H04N 1/00055* (2013.01); *H04N 1/00063* (2013.01); *H04N 1/00076* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,766,448 A | * | 8/1988 | Hack ........................ | B41J 2/395 347/141 |
| 5,347,265 A | * | 9/1994 | Shimura .............. | G08B 21/187 340/635 |
| 5,787,114 A | * | 7/1998 | Ramamurthy ...... | G06F 11/2221 370/249 |
| 6,318,828 B1 | * | 11/2001 | Barbour ................ | B41J 2/0451 347/11 |
| 6,318,850 B1 | * | 11/2001 | Childers .............. | B41J 2/17506 347/85 |
| 6,322,205 B1 | * | 11/2001 | Childers .............. | B41J 2/17509 347/85 |

(Continued)

OTHER PUBLICATIONS

Remple, Terry, *Battery Charging Specification (Revision 1.1)*, USB Implementers Forum, Inc., Apr. 15, 2009 pp. i-vi and 1-38 (relevant prior art: chapter 3).

(Continued)

*Primary Examiner* — Ted Barnes
(74) *Attorney, Agent, or Firm* — Staas & Halsey LLP

(57) ABSTRACT

An electronic device that checks a connected state of a signal line is provided. The electronic device includes a controller configured to transmit a check signal and at least one module configured to include a closed loop and receive the check signal. When the controller receives the check signal through the closed loop, the controller determines that the at least one module is connected to the controller.

18 Claims, 10 Drawing Sheets

(56) References Cited

U.S. PATENT DOCUMENTS

| | | | | |
|---|---|---|---|---|
| 6,435,668 B1* | 8/2002 | Barbour | B41J 2/04528 | 347/60 |
| 6,476,928 B1* | 11/2002 | Barbour | B41J 2/04506 | 347/20 |
| 6,565,177 B1* | 5/2003 | Corrigan, III | B41J 2/04528 | 19/17 |
| 6,575,548 B1* | 6/2003 | Corrigan, III | B41J 2/04506 | 347/19 |
| 6,598,168 B1* | 7/2003 | Chen | G06F 1/30 | 713/300 |
| 6,693,722 B1* | 2/2004 | Mixer, Jr. | G06K 15/00 | 358/1.13 |
| 6,705,694 B1* | 3/2004 | Barbour | B41J 2/04506 | 347/19 |
| 6,783,078 B1* | 8/2004 | Leaming | G06F 11/27 | 235/492 |
| 6,825,951 B1* | 11/2004 | Vives | B41J 2/04563 | 358/1.8 |
| 9,073,374 B1* | 7/2015 | Moore | B41J 29/393 | |
| 2001/0023492 A1* | 9/2001 | Cheng | G06F 11/27 | 714/44 |
| 2002/0020166 A1* | 2/2002 | Asakura | F01D 17/24 | 60/39.182 |
| 2002/0024570 A1* | 2/2002 | Childers | B41J 2/17506 | 347/85 |
| 2002/0024571 A1* | 2/2002 | Childers | B41J 2/17506 | 347/85 |
| 2002/0052704 A1* | 5/2002 | Miyamura | G06F 13/4068 | 702/117 |
| 2002/0145528 A1* | 10/2002 | Walter | G01D 3/024 | 340/657 |
| 2002/0179872 A1* | 12/2002 | Asakura | F01D 17/24 | 251/129.04 |
| 2003/0035473 A1* | 2/2003 | Takinosawa | H04L 1/244 | 375/224 |
| 2003/0048474 A1* | 3/2003 | Hong | B65H 3/44 | 358/1.15 |
| 2003/0132780 A1* | 7/2003 | Kim | G01R 31/026 | 326/86 |
| 2003/0206220 A1* | 11/2003 | Childers | B41J 2/17506 | 347/85 |
| 2004/0027432 A1* | 2/2004 | Childers | B41J 2/17509 | 347/86 |
| 2004/0061878 A1* | 4/2004 | Vives | B41J 2/04563 | 358/1.8 |
| 2005/0169352 A1* | 8/2005 | Perdue | H04N 21/42607 | 375/147 |
| 2006/0053343 A1* | 3/2006 | Hayem | G06F 11/2236 | 714/39 |
| 2007/0030518 A1* | 2/2007 | Okamoto | H04N 1/00912 | 358/1.15 |
| 2007/0059016 A1* | 3/2007 | Sato | G03G 15/80 | 399/88 |
| 2007/0230555 A1* | 10/2007 | Peleg | H04B 3/48 | 375/232 |
| 2008/0077333 A1* | 3/2008 | Maxey | G08B 13/169 | 702/34 |
| 2008/0180756 A1* | 7/2008 | Nagasaka | H04N 1/00002 | 358/474 |
| 2008/0238491 A1* | 10/2008 | Aizawa | H03K 19/0185 | 327/65 |
| 2009/0015862 A1* | 1/2009 | Kim | H04N 1/00204 | 358/1.15 |
| 2010/0045315 A1* | 2/2010 | Sleijpen | B41J 29/393 | 324/762.02 |
| 2010/0098413 A1* | 4/2010 | Li | H04B 10/0795 | 398/38 |
| 2010/0180283 A1* | 7/2010 | Kim | G06F 8/20 | 719/327 |
| 2010/0229041 A1* | 9/2010 | Chen | G06F 11/3041 | 714/30 |
| 2010/0289847 A1* | 11/2010 | Ishizawa | B41J 2/1752 | 347/19 |
| 2011/0043703 A1* | 2/2011 | Cheng | G06F 3/1431 | 348/607 |
| 2011/0081160 A1* | 4/2011 | Yoon | G03G 15/80 | 399/88 |
| 2011/0150188 A1* | 6/2011 | Buss | G08B 29/123 | 379/27.01 |
| 2012/0009883 A1* | 1/2012 | Shan | G06F 1/3209 | 455/67.11 |
| 2012/0074785 A1* | 3/2012 | Fichtlscherer | G05B 19/0428 | 307/63 |
| 2012/0270419 A1* | 10/2012 | Shahoian | G06F 13/4068 | 439/55 |
| 2012/0290761 A1* | 11/2012 | Chen | G06F 13/4045 | 710/305 |
| 2012/0295473 A1* | 11/2012 | Chen | H01R 31/06 | 439/505 |
| 2013/0159585 A1* | 6/2013 | Ogawa | G06F 13/4291 | 710/305 |
| 2013/0221872 A1* | 8/2013 | Gan | H05B 37/0254 | 315/292 |
| 2013/0241739 A1* | 9/2013 | Chen | H05B 33/0842 | 340/815.45 |
| 2013/0249397 A1* | 9/2013 | Chandran | H05B 37/0263 | 315/85 |
| 2013/0307906 A1* | 11/2013 | Ishizawa | B41J 2/1752 | 347/50 |
| 2014/0164663 A1* | 6/2014 | Peng | G06F 13/4068 | 710/301 |
| 2015/0046613 A1* | 2/2015 | Hurd | H04L 49/00 | 710/105 |
| 2015/0103372 A1* | 4/2015 | Wang | G03G 15/6552 | 358/1.15 |
| 2015/0109636 A1* | 4/2015 | Tanaka | H04N 1/00344 | 358/1.15 |
| 2015/0142993 A1* | 5/2015 | Blanc | G06F 13/387 | 710/16 |
| 2015/0168477 A1* | 6/2015 | Martin | G06F 13/4247 | 324/503 |
| 2016/0025795 A1* | 1/2016 | Martin | G06F 13/4247 | 324/503 |

OTHER PUBLICATIONS

Ed. Anonymous, "Multiplexer," *Wikipedia*, Wikimedia Foundation, last revised Oct. 28, 2013 (note: NOT current edition), retrieved Mar. 4, 2015, pp. 1-7.

Extended European Search Report mailed Mar. 13, 2015 for corresponding European Patent Application No. 14189238.0.

European Office Action dated Dec. 4, 2015 in corresponding European Patent Application No. 14189238.0.

* cited by examiner

ELECTRONIC DEVICE AND METHOD OF CHECKING CONNECTED STATE OF SIGNAL LINE THEREOF

CROSS-REFERENCE TO RELATED APPLICATIONS

This application claims the benefit of priority under 35 U.S.C. §119 from Korean Patent Application No. 10-2013-0133739, filed on Nov. 5, 2013, in the Korean Intellectual Property Office, the disclosure of which is incorporated herein by reference in its entirety.

BACKGROUND OF THE INVENTION

1. Field of the Invention

The present general inventive concept generally relates to providing an electronic device and a method of checking a connected state of a signal line thereof, and more particularly, to providing an electronic device that, when a controller of the electronic device transmits a check signal to another module of the electronic device and then receives the check signal through a closed loop of the module, determines that a connected state between the controller and the module is normal, and a method of checking a connected state of a signal line thereof.

2. Description of the Related Art

A wire harness unites a plurality of wires into one and combines connectors with both ends of the united wire. The wire harness is used for a plurality of electronic devices in which electrical devices are connected to one another.

For example, if an electronic device is an image forming apparatus, such as a printer, a fax machine, a multifunction peripheral (MFP), or the like, the wire harness is used to connect a controller including a central processing unit (CPU) for controlling an overall operation of the image forming apparatus to a plurality of modules performing an image forming job, for example, a motor, a Laser Scanning Unit (LSU), an organic photo conductor (OPC), etc.

An existing technology uses a method of checking a connected state between a controller and modules using the wire harness by using one signal line connected through a ground (GND) loop as described below.

FIG. 1 is a view illustrating a method of checking a connected state according to a related art.

Referring to FIG. 1, an electronic device includes a controller 10 that includes a CPU, etc., a module 20 that performs an operation according to a control signal of the controller 10, a resistor 30 that checks a connected state between the controller 10 and the module 20, wire harness 40 that connects the controller 10 and the module 20 to each other, and connectors 50 and 60 that bind the wire harness 40.

If the connected state between the controller 10 and the module is not normal, a check signal transmitted from the controller 10 directly flows into GND, and thus the resistor 30 detects a high signal.

If the connected state between the controller 10 and the module is normal, a control signal transmitted from the controller 10 flows into the GND through a closed loop of the module 20, and thus the resistor 30 detects a low signal.

However, if the connected state between the controller 10 and the module 20 is normal, but the wire harness 40 is short-circuited with the GND or the electric source, a high signal is detected on the resistor 30. Therefore, the controller 10 determines that the connected state between the controller 10 and the module 20 is not normal.

SUMMARY OF THE INVENTION

The exemplary embodiments of the present general inventive concept provide, among other things, a method of accurately and rapidly checking a connected state between a controller and a module or another module through a wire harness.

Additional features and utilities of the present general inventive concept will be set forth in part in the description which follows and, in part, will be obvious from the description, or may be learned by practice of the general inventive concept.

The exemplary embodiments of the present general inventive concept provide an electronic device that, when a controller transmits a check signal to a module and then receives the check signal through a closed loop of the module, further accurately and rapidly checks a connected state between modules, and a method of checking a connected state of a signal line thereof.

The foregoing and/or other features and utilities of the present general inventive concept may be achieved by providing an electronic device configured to check a connected state of a signal line. The electronic device may include a controller configured to transmit a check signal, and at least one module configured to comprise a closed loop and receive the check signal. When the controller receives the check signal through the closed loop, the controller may determine that the at least one module is connected to the controller.

The electronic device may further include a connector configured to connect the at least one module to the controller through a signal line.

The signal line may be wire harness.

The connector may include a first socket configured to transmit the check signal through the closed loop and a second socket configured to receive the check signal from the closed loop. The first and second sockets may be sockets of a plurality of sockets of the connector and may be positioned at an outermost edge of the connector.

The electronic device may further include a display unit configured to display the determined connected state between the controller and the at least one module.

The controller may be configured to transmit the check signal at preset time intervals to check the connected state between the controller and the at least one module.

The electronic device may further include a multiplexer (MUX) configured to divide the check signal transmitted from the controller into a plurality of output or a MUX configured to collect the check signal input through the closed loop of the at least one module and selectively transmit the collected check signal to the controller.

Exemplary embodiments of the present general inventive concept may also provide a method of checking a connected state of a signal line of an electronic device including a controller configured to control an operation of the electronic device and at least one module configured to perform an operation according to a control signal of the controller. The method may include transmitting a check signal from the controller, receiving the check signal in the at least one module comprising a closed loop, and determining that the at least one module is connected to the controller when the controller receives the check signal through the closed loop.

The signal line may be a wire harness.

The method may further include displaying a determined connected state between the controller and the at least one module on a display unit.

The determining operation may be performed at preset time intervals.

The method may further include dividing the check signal transmitted from the controller into a plurality of outputs.

The method may further include selectively transmitting a check signal received through respective closed loops of a plurality of modules to the controller.

Exemplary embodiments of the present general inventive concept may also provide an electronic device configured to test a signal line, including a module unit to perform one or more functions of the electronic device and configured to include a closed loop connected to a first connector, a signal line connected to the first connector, and a controller connected to the signal line, configured to transmit a check signal to the module unit and to determine that the module unit is correctly connected to the controller when the controller receives the check signal through the closed loop.

The electronic device may include a display unit configured to receive control signals from the controller and to display a user interface representing the determination made by the controller in order to communicate a connection state of the signal line.

The electronic device may include a multiplexer configured to output the check signal transmitted from the controller to any of a plurality of module units.

The electronic device may include a multiplexer configured to collect a plurality of signals transmitted from a plurality of module units and selectively transmit one of the collected signals to the controller.

The signal line may include a plug having a plurality of pins, and at least two pins of the plug may be respectively configured to provide contacts for a line to transmit the check signal from the controller to the module unit and a line to transmit the check signal from the module unit to the controller.

The plurality of pins may be linearly arranged and the at least two pins may be positioned on the outermost ends of the plurality of pins.

The electronic device may be a multifunction peripheral device (MFP).

BRIEF DESCRIPTION OF THE DRAWINGS

The above and/or other features and utilities of the present general inventive concept will be more apparent by describing certain exemplary embodiments with reference to the accompanying drawings, in which.

DETAILED DESCRIPTION OF THE PREFERRED EMBODIMENTS

Figure 1:
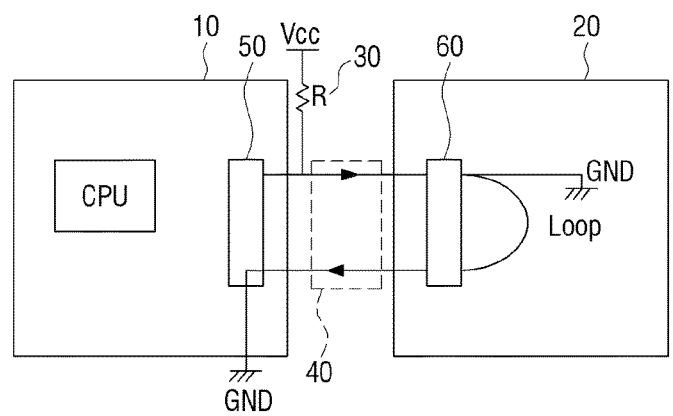
FIG. 1 is a view illustrating a method of checking a connected state according to a related art.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 2:
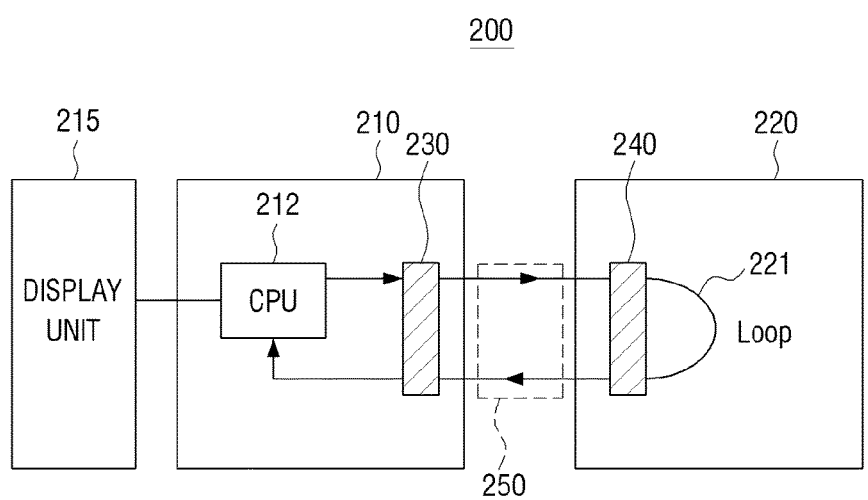
FIG. 2 is a block diagram illustrating an electronic device that checks a connected state of a signal line, according to an exemplary embodiment of the present general inventive concept.

FIG. 2 illustrates an electronic device 200 that checks a connected state of a signal line, according to an exemplary embodiment of the present general inventive concept. Referring to FIG. 2, the electronic device 200 includes a controller 210, a module 220, a signal line 250 and a display unit 215.

The electronic device 200 of FIG. 2 is illustrated as including elements that are related to the present exemplary embodiment. However, it should be understood that the electronic device 200 may further include other general-purpose and/or special function elements besides the elements illustrated in FIG. 2.

For example, if the electronic device 200 is an image forming apparatus such as a printer, a copier, a multifunction peripheral (MFP), or the like, the controller 210 may be an element that transmits various types of control signals for controlling the image forming apparatus, and the module 220 may be a motor, a laser scanning unit (LSU), an organic photo conductor (OPC), or the like that performs an image forming job according to a user command. A plurality of modules may thus function together under the control of the controller 210 as a printing unit to print image data onto print media, such as paper or film.

The controller 210 may include a processor, for example, a CPU 212 to generate check signals and control signals. The controller 210 and at least one module 220 may be connected to each other through the signal line 250, which may be included in a wire harness (not illustrated). Connectors 230 and 240 are elements that bind a cable, such as signal line 250 or a wire harness, and may include sockets that are connected to a plurality of pins included in signal line 250 or the wire harness. In the above-described exemplary embodiment, the controller 210 is connected to one module 220. However, the controller 210 may be connected to a plurality of modules.

The controller 210 transmits a check signal for checking a connected state between the controller 210 and the module 220. If the controller 210 receives the check signal back from the module 220, the controller 210 may determine that the connected state between the controller 210 and the module 220 is normal. A normal connected state may be considered to be a state in which the controller 210 and the module 220 are functionally connected to each other such that signals may be transmitted between the controller 210 and the module 220 to facilitate operations of the electronic device 200. If the controller 210 does not receive the check signal back from the module 220, the controller 210 may determine that the connected state between the controller 210 and the module 220 is not normal. A connected state which is not normal may be referred to as a poor connected state. A poor connected state may be considered to be a state in which the controller 210 and the module 220 are not connected to each other to a fully functional degree such that signals may be hampered and/or prevented from being transmitted between the controller 210 and the module 220.

The module 220 includes a closed loop 221 that receives the check signal from the controller 210 and transmits the check signal back to the controller 210.

If the connected state between the controller 210 and the module 220 is normal, the check signal transmitted from the controller 210 is transmitted back into the controller 210 through the closed loop 221 of the module 200. If the connected state between the controller 210 and the module 220 is not normal, the check signal may not be transmitted back into the controller 210.

If the wire harness (i.e., that includes the signal line 250) connecting the controller 210 and the module 220 or a connector binding the wire harness is damaged, open or short-circuited, the check signal transmitted from the controller 210 may not be transmitted back to the controller 210 through the closed loop 221 of the module 220. Therefore, the controller 210 may accurately determine that the connected state between the controller 210 and the module 220 is not normal.

The display unit 215 of the electronic device 200 may be connected to the controller 210. The display unit 215 may comprise, for example, a liquid crystal display (LCD) panel, an light emitting diode (LED) display panel, or organic light-emitting diode (OLED) display panel. The display 215 may further comprise a touch screen to receive input from a user of the electronic device 200. The display unit 215 may display information regarding the operation of the electronic device 200. The controller 210 may control the display unit 215 to display the determined connected state between the controller 210 and the module 220 or plurality of modules.

Figure 3:
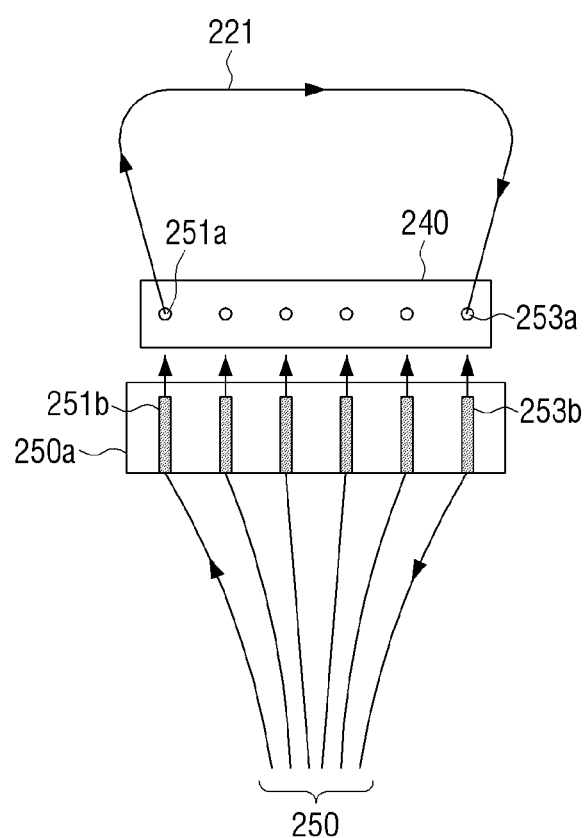
FIG. 3 is a view illustrating a connector according to an exemplary embodiment of the present general inventive concept.

FIG. 3 illustrates a connector according to an exemplary embodiment of the present general inventive concept.

Hereinafter, for convenience of description, the connector 240 will be described as being installed in the module 220.

As illustrated in FIG. 3, the connector 240 may include a first terminal or socket 251a that receives the check signal from the controller 210 and a second socket 253a that transmits the check signal to the controller 210 through the closed loop 221 of the module 220 (illustrated in FIG. 2). The connector 240 may further include a plurality of terminals and/or sockets that transmit and receive one or more other control signals, besides sockets 251a, 253a for transmitting and receiving the check signal.

Signal line 250 may include a plug 250a having a plurality of pins. The plurality of pins may be arranged in a linear format. Outermost pins 251b and 253b may be used to transmit and receive the check signal from the controller 210, respectively. However, the present general inventive concept is not limited to this configuration. The check signal may be transmitted or received through other pins as well and the plurality of pins may be arranged in a non-linear format. Furthermore, the use of pins and sockets may be replaced with other types of connecting terminal devices.

In one exemplary embodiment, the first and second sockets 251a and 253a that transmit and receive the check signal may be positioned at an outermost edge of the connector 240. The reason is as follows. In general, if both end pins 251b and 253b of the plurality of pins included in the signal line plug 250a are well connected to the connector 240, the other pins may be well connected to the connector 240.

In the illustrated exemplary embodiment, the number of pins of the signal line plug 250a is six, and the number of sockets of the connector 240 is six. However, a larger or smaller number of pins and sockets may be included.

Figure 4:
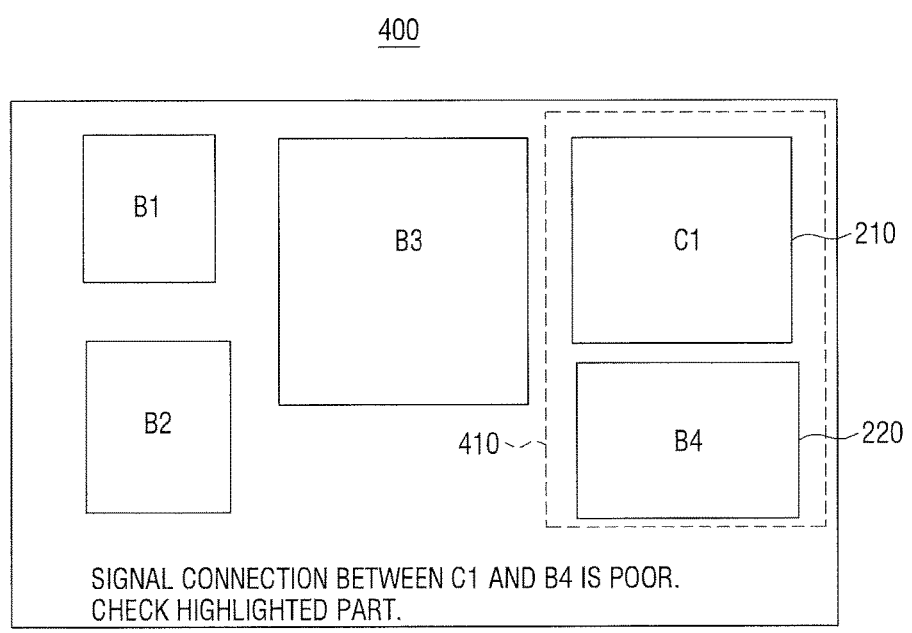
FIG. 4 is a view illustrating a user interface (UI) that is displayed on a display unit that displays a connected state between a controller and a module, according to an exemplary embodiment of the present general inventive concept.

FIG. 4 illustrates a user interface (UI) 400 which may be displayed on the display unit 215 to communicate a status of a connected state between controller 210 and one or more modules, according to an exemplary embodiment of the present general inventive concept.

In detail, if a check signal transmitted from the controller 210 does not return to the controller 210 through a closed loop of a module 220, the controller 210 may determine that a connected state between the controller 210 and the module 220 is not normal. Accordingly, the controller 210 of the electronic device 200 may control the display unit 215 to display UI 400 in order to communicate the connected state between the controller 210 and the module 220.

For example, the UI 400 may display a diagram of the electronic device 200, including representations of a plurality of modules B1-B4. The UI 400 may indicate which connected state between any of the plurality of modules B1-B4 and the controller 210 is not normal. For example, the UI 400 may provide visual and/or textual notice of which parts have been determined to have a connection that is not normal. As illustrated in FIG. 4, visual notice may be provided by highlighting the controller 210 and the module 220, for example, with a border 410 which may be displayed in a highlighting color. Textual notice may be provided via a message displayed on the display unit 215.

Alternatively, as detailed below, the UI 400 may display whether a connected state of a signal line, which is connected to one of a plurality of connectors included in a particular module, is not normal.

Figure 5:
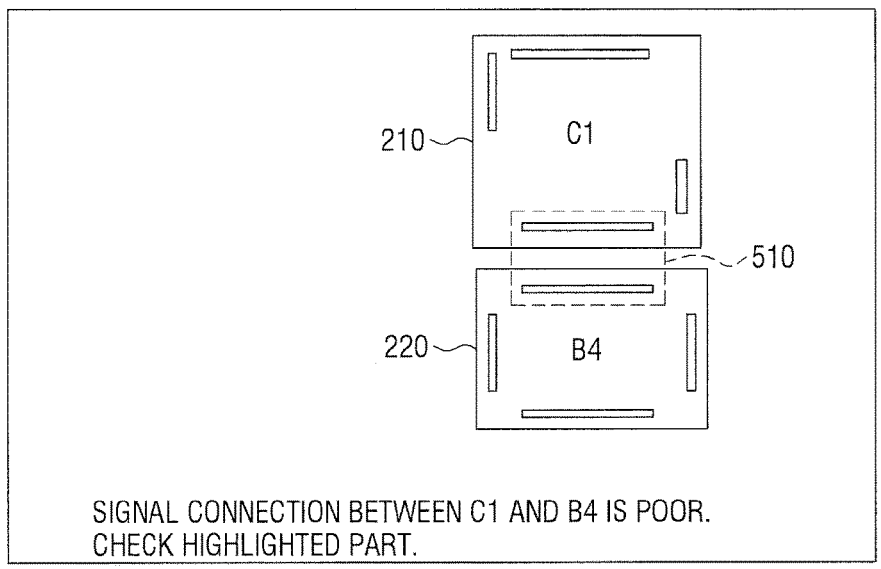
FIG. 5 is a view illustrating a user interface (UI) that is displayed on a display unit, according to an exemplary embodiment of the present general inventive concept.

FIG. 5 is a view illustrating another UI 500 that may be displayed on the display unit 215, according to an exemplary embodiment of the present general inventive concept.

According to the exemplary embodiment illustrated in FIG. 5, the UI 500 may display a controller 210 and a module 220 having each having connectors and display that a connected state of a signal line connected to one of the connectors is poor, i.e., potentially less than functional for transmitting signals.

For example, the UI 500 may display a connector of a module having a poor connected state highlighted with a border 510 of another color or with a warning light to allow a user to immediately check whether a connected state of which connector is poor.

Therefore, the UI 500 may communicate information in a manner which allows the user to intuitively recognize that a connected state of a specific part is poor.

Figure 6:
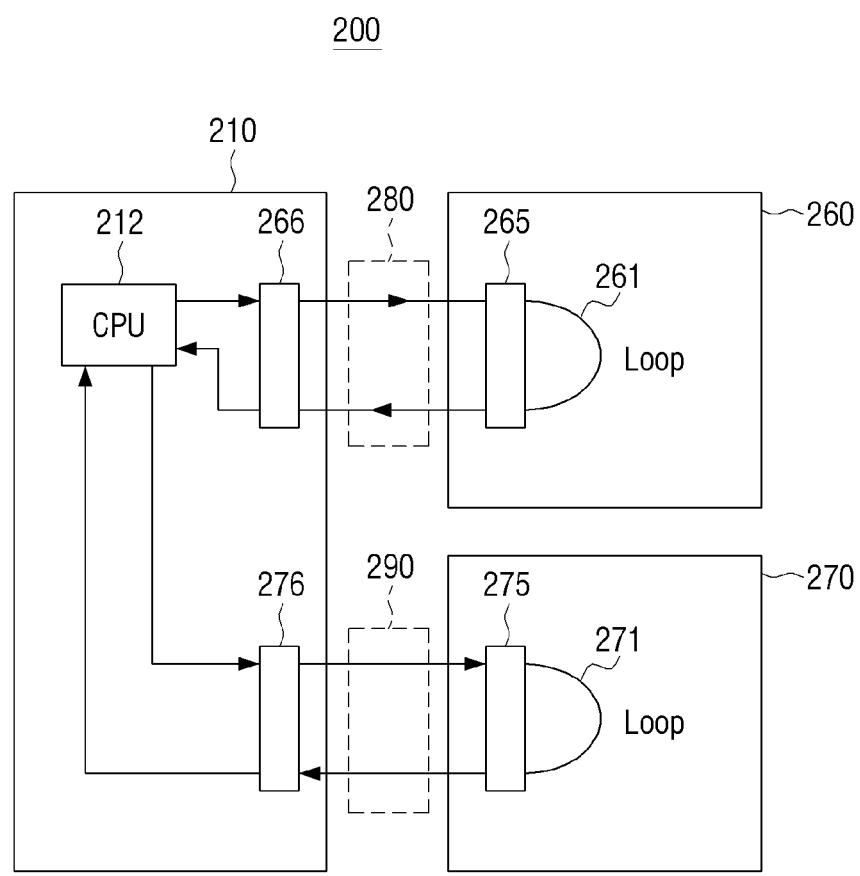
FIG. 6 is a view illustrating a controller that is connected to a plurality of modules, according to an exemplary embodiment of the present general inventive concept.

In the above-described exemplary embodiment, the controller 210 is connected to one module 220. However, the controller 210 may be connected to a plurality of modules 220. FIG. 6 illustrates the electronic device 200, where the controller 210 is connected to a plurality of modules, according to an exemplary embodiment of the present general inventive concept.

In FIG. 6, one controller 210 having connectors 266 and 276 is connected to two modules 260 and 270, having connectors 265 and 275, respectively. However, a larger number of modules may be connected to the controller 210.

The controller 210 transmits a check signal to check a connected state between the controller 210 and the first module 260. The check signal is transmitted to the first module 260 through a signal line 280 (for example, a wire harness) and then transmitted back to the controller 210 through a closed loop 261 of the first module 260. If the controller 210 receives the transmitted check signal back from the first module 260, the controller 210 may determine that the connected state between the controller 210 and the first module 260 is normal.

If the check signal transmitted from the controller 210 is not transmitted back to the controller 210 from the first module 260, then the controller 210 may determine that the connected state between the controller 210 and the first module 260 is poor and display information about this on the display unit 215 of the electronic device 200 (as illustrated in FIG. 2).

Also, the same operation may be performed when a connected state between the controller 210 and the second module 270 is checked.

The controller 210 transmits a check signal to check the connected state between the controller 210 and the second module 270. The check signal is transmitted to the second module 270 through a signal line 290 (for example, a wire harness) and then transmitted back to the controller 210 through a closed loop 271 of the second module 270. If the controller 210 receives the transmitted check signal back from the second module 270, the controller 210 may determine that the connected state between the controller 210 and the second module 270 is normal.

If the check signal transmitted from the controller 210 is not transmitted back to the controller 210 from the second module 270, then the controller 210 may determine that the connected state between the controller 210 and the second module 270 is poor and display information about this on the display unit 215 of the electronic device 200 (as illustrated in FIG. 2).

As described above, if the controller 210 is connected to a plurality of modules, the number of input/output (I/O) ports to the CPU 212 may increase as the number of modules connected to the controller 210 increases.

Alternatively, if a multiplexer (MUX) that divides and outputs a check signal transmitted from the CPU 212 of the controller 210 into a plurality of signals is included, the number of I/O ports may be reduced.

Figure 7:
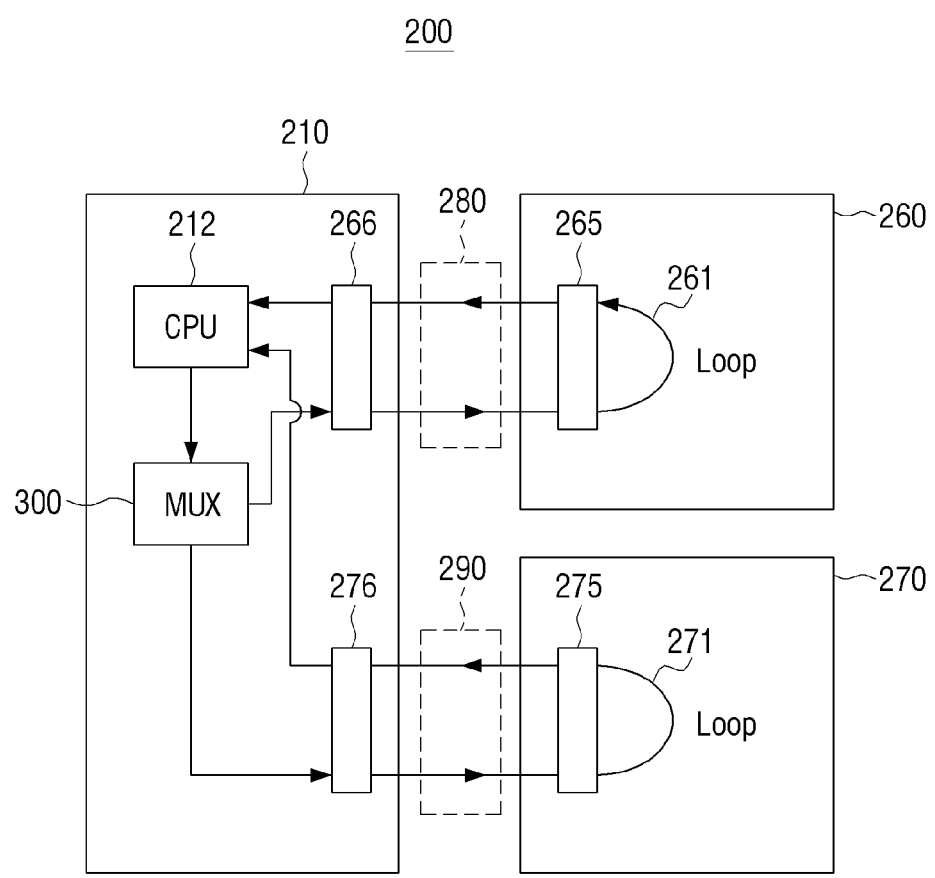
FIG. 7 is a view illustrating an electronic device further including a multiplexer, according to an exemplary embodiment of the present general inventive concept.

FIG. 7 illustrates an electronic device 200 further including a MUX 300, according to an exemplary embodiment of the present general inventive concept.

The controller 210 is connected to two modules 260 and 270 in FIG. 7 but may be connected to a larger number of modules.

The MUX 300 divides a check signal output from a controller 210 into a plurality of outputs.

The check signal that is divided and output by the MUX 300 is transmitted to the modules 260 and 270 connected to the controller 210 and then transmitted back to the controller 210 through closed loops 261 and 271 of the modules 260 and 270, respectively.

If the check signal is divided into the plurality of outputs and output by the MUX 300 and then transmitted back to the controller 210, the controller 210 may determine that connected states between the controller 210 and the modules 260 and 270 are normal. If the check signal is not transmitted back to the controller 210 through the closed loops 261 and 271 of the modules 260 and 270, respectively, the controller 210 may determine that the connected states between the controller 210 and the modules 260 and 270 are poor.

As described above, the MUX 300 that divides a check signal transmitted from a controller into a plurality of outputs may be included. Therefore, the number of I/O ports corresponding to the number of existing modules may be reduced.

In FIG. 7, the MUX 300 divides the check signal transmitted from the controller 210 into a plurality of outputs and outputs the plurality of outputs. However, the MUX 300 may collect a signal, which is transmitted back to the controller 280 through a closed loop of a module, and selectively transmit the signal to the controller 210.

Figure 8:
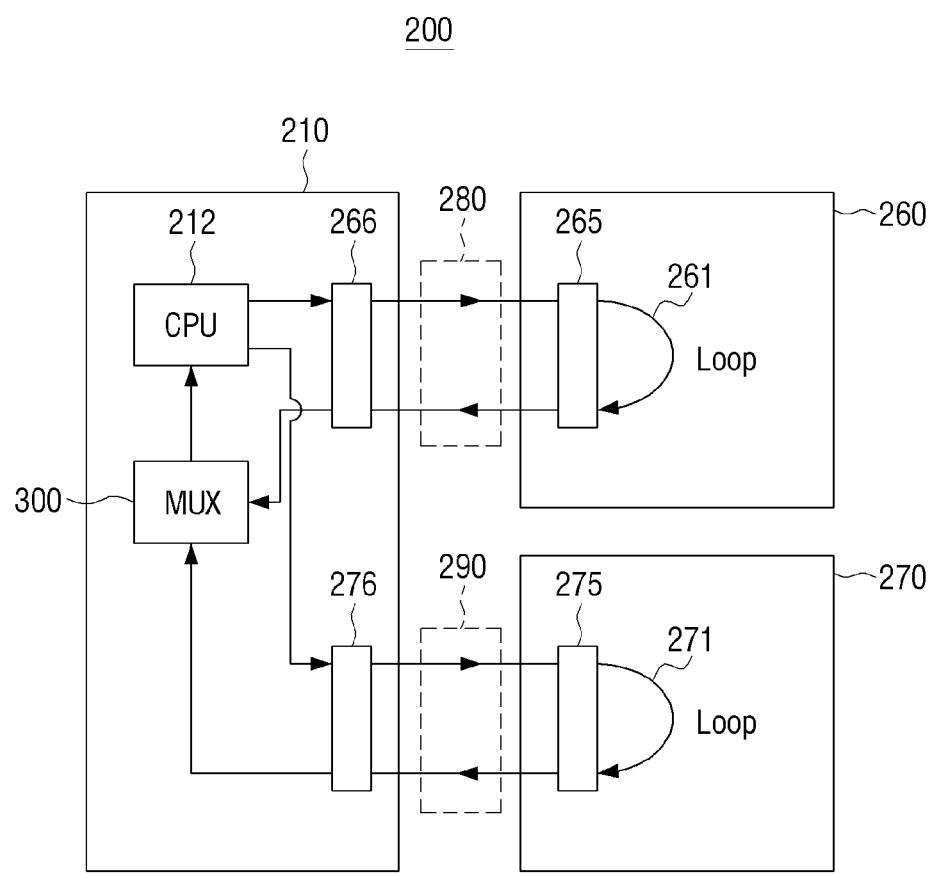
FIG. 8 is a view illustrating a multiplexer that collects a check signal input into a controller, according to an exemplary embodiment of the present general inventive concept.

FIG. 8 is a view illustrating a MUX 310 that collects a check signal transmitted back to a controller 210, according to an exemplary embodiment of the present general inventive concept.

The MUX 310 of FIG. 8 may collect a check signal input from a plurality of modules and selectively transmit the check signal to the controller 210.

The controller 210 may receive the check signal through closed loops 261 and 271 of modules 260 and 270, respectively, to check connected states between the controller 210 and the modules 260 and 270.

Similarly, if the MUX 310 collects checks signals input from a plurality of modules and selectively transmits the check signals to the controller 210, the number of I/O ports to the CPU 212 may be reduced, and thus cost may be reduced.

Connected states between the controller 210 and the plurality of modules may be checked at default or user designated times, for example, whenever the electronic device 200 is initialized, whenever the electronic device is being powered down, at a preset time, recurring at preset time intervals, or triggered by specific events, such as the connecting of new hardware.

Figure 9:
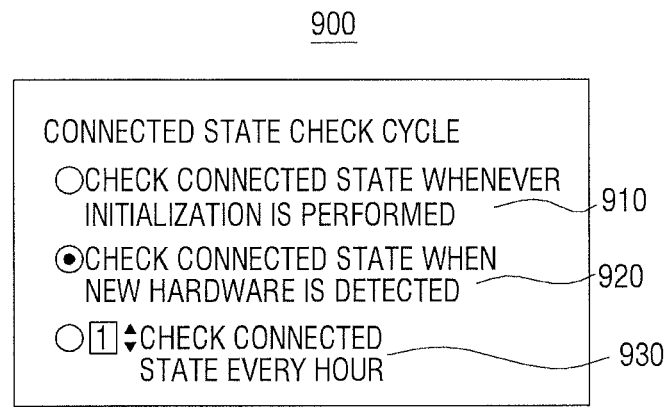
FIG. 9 is a view illustrating a UI that sets a cycle for checking a connected state of a module, according to an exemplary embodiment of the present general inventive concept.

FIG. 9 is a view illustrating an exemplary UI 900 to set a cycle for checking a connected state of a module, according to an exemplary embodiment of the present general inventive concept.

The electronic device 200 may display the UI 900 for setting a cycle for checking a connected state on the display unit 215 (illustrated in FIG. 2). A user may set the cycle for checking the connected state of the module by using the UI 900 displayed on the display unit 215.

If the user sets a connected state to be checked whenever the electronic device 200 is initialized (selection option 910), and power of the electronic device 200 is turned on or a system is initialized by the user, a connected state of a module (e.g., 220, 260, 270) connected to the controller 210 is checked.

Alternatively, if new hardware having a new module is searched in the electronic device 200, the user may set a connected state of the new hardware to be checked (selection option 920). The electronic device 200 may support a Plug and Play (PnP) function and thus recognize a new module if the module is connected to a connector of the electronic device 200. Therefore, if the user sets to check a connected state of new hardware whenever the new hardware is connected, and the new hardware is recognized by the PnP function, a connected state between a controller and the new hardware is checked.

The user may set the cycle for checking the connected state according to a chronological intention of the user (selection option 930). In the setting illustrated in the present exemplary embodiment of FIG. 9, when one hour elapses, the connected state is checked. However, the cycle may be changed according to an intention of the user.

Figure 10:
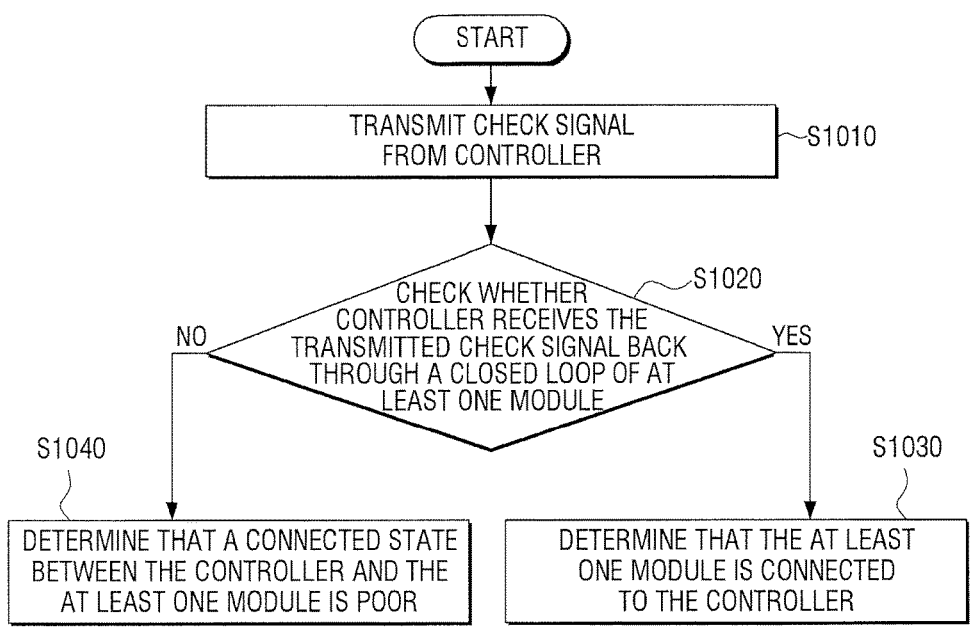
FIG. 10 is a flowchart illustrating a method of checking a connected state of a signal line of an electronic device, according to an exemplary embodiment of the present general inventive concept.

FIG. 10 is a flowchart illustrating a method of checking a connected state of a signal line of an electronic device, according to an exemplary embodiment of the present general inventive concept.

In operation S1010, a controller transmits a check signal for checking a connected state between the controller and at least one module that is included in the electronic device to perform various functions.

In operation S1020, the controller checks whether the check signal is received back to the controller through a closed loop of the at least one module that received the transmitted check signal.

In operation S1030, if the controller receives the check signal back through the closed loop of the module, the controller determines that the connected state between the controller and the module is normal.

In operation S1040, if the controller is not connected to the at least one module, the check signal transmitted from the controller is not transmitted back to the controller. In this case, the controller may determine that the connected state between the controller and the module is poor.

According to an electronic device and a method of checking a connected state of a signal line of the electronic device as described above, connected states between modules of the electronic device may be effectively checked. Therefore, reliability of a produce may be improved, and a module having a poor connected state may be easily detected.

The above-described method may be written as a program that may be executed in a computer and may be realized in a general-purpose digital computer that executes the program by using a computer-readable recording medium. A structure of data that is used in the above-described method may be recorded on the computer-readable recording medium through several means. The computer-readable recording medium includes storage media such as a magnetic storage medium (for example, a read only memory (ROM), a floppy disk, a hard disk, or the like), an optical reading media (for example, a CD-ROM, a digital versatile disk (DVD), or the like), etc.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

Therefore, although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus configured to check a connected state of a signal line, the image forming apparatus comprising:
   a controller configured to transmit a check signal;
   at least one electronic module, each at least one electronic module includes a first socket to receive the check signal, a second socket to transmit the check signal, and a closed loop to directly connect the first socket and the second socket; and
   a connector configured to connect an electronic module among the at least one electronic module to the controller,
   wherein the controller is configured to determine that the at least one electronic module is connected to the controller when the controller receives the transmitted check signal through the closed loop and to determine that the at least one electronic module is not connected to the controller when the controller does not receive the transmitted check signal through the closed loop,
   wherein the at least one electronic module includes one or more of a motor, a laser scanner, a photoconductor, and an electronic hardware, and
   wherein the first socket and the second socket are outermost sockets of a plurality of sockets included in the connector.

2. The image forming apparatus of claim 1,
   wherein the connector configured to connect the at least one electronic module to the controller through the signal line.

3. The image forming apparatus of claim 2, wherein the signal line is a wire harness.

4. The image forming apparatus of claim 2, further comprising:
   a plug, the plug comprising:
      first pin configured to transmit the check signal through the closed loop; and
      second pin configured to receive the check signal from the closed loop.

5. The image forming apparatus of claim 4, wherein the first pin and second pin pins of the plug and are positioned as outermost pins of the plug.

6. The image forming apparatus of claim 1, further comprising:
   a display configured to display the determined connected state between the controller and the at least one module.

7. The image forming apparatus of claim 1, wherein the controller is configured to transmit the check signal at preset time intervals to check the connected state between the controller and the at least one module.

8. The image forming apparatus of claim 1, further comprising:
   a multiplexer (MUX) configured to divide the check signal transmitted from the controller into a plurality of outputs.

9. The image forming apparatus of claim 1, further comprising:
   a multiplexer (MUX) configured to collect the check signal input through the closed loop of the at least one electronic module and selectively transmit the collected check signal to the controller.

10. A method of checking a connected state of a signal line of an image forming apparatus having a controller configured to control an operation of the image forming apparatus and at least one electronic module configured to perform an operation according to a control signal of the controller, the method comprising:
   transmitting a check signal from the controller;
   receiving the transmitted check signal in the at least one electronic module including a connector comprising a first connector to receive the check signal, a second connector to transmit the check signal, and a closed loop to directly connect the first connector and the second connector, the connector configured to connect an electronic module among the at least one electronic module to the controller; and determining that the at least one electronic module is connected to the controller when the controller receives the transmitted check signal through the closed loop and determining that the at least one electronic module is not connected to the controller when the controller does not receive the transmitted check signal through the closed loop, wherein the at least one electronic module includes one or more of a motor, a scanner, a photoconductor, and an electronic hardware, and wherein the first connector and the second connector are outermost connectors of a plurality of connectors included in the connector, and wherein the first connector is one of a first socket and a first pin and the second connector is one of a second socket and a second pin.

11. The method of claim 10, wherein the signal line is a wire harness.

12. The method of claim 10, further comprising:
displaying a determined connected state between the controller and the at least one electronic module on a display.

13. The method of claim 10, further comprising:
performing the determining operation at preset time intervals.

14. The method of claim 10, further comprising:
dividing the check signal transmitted from the controller into a plurality of outputs.

15. The method of claim 10, further comprising:
selectively transmitting the check signal received through respective closed loops of a plurality of modules to the controller.

16. An image forming apparatus configured to test a signal line, comprising:

an electronic module unit to perform one or more functions of the image forming apparatus and includes a first connector of a connector to receive the check signal, a second connector of the connector to transmit the check signal, and a closed loop to directly connect the first connector and the second connector, the closed loop being connected to the connector;

the signal line connected to the connector; and a controller connected to the signal line, configured to transmit a check signal to the electronic module unit, to determine that the electronic module is correctly connected to the controller when the controller receives the transmitted check signal through the closed loop, and to determine that the electronic module is not connected to the controller when the controller does not receive the transmitted check signal through the closed loop, wherein the connector configured to connect the electronic module to the controller, wherein the electronic module includes one or more of a motor, a laser scanner, a photoconductor, and an electronic hardware, wherein the first connector and the second connector are outermost connectors of a plurality of connectors included in the connector, and wherein the first connector is one of a first socket and a first pin and the second connector is one of a second socket and a second pin.

17. The image forming apparatus of claim 16,
wherein the signal line comprises a plug including a plurality of pins, and at least two pins of the plurality of pins of the plug are respectively configured to provide contacts for a line to transmit the check signal from the controller to the electronic module and a line to transmit the check signal from the electronic module to the controller, and wherein the first connector is the first socket and the second connector is the second socket.

18. The image forming apparatus of claim 17,
wherein the plurality of pins are linearly arranged and a first pin and a second pin are positioned as outermost pins of the plurality of pins, and wherein the check signal is routed through the first pin and the second pin which are positioned as the outermost pins of the plurality of pins.

* * * * *